April 17, 1934.   F. H. LOVELESS   1,955,196
SIGN
Filed Dec. 7, 1932   3 Sheets-Sheet 1
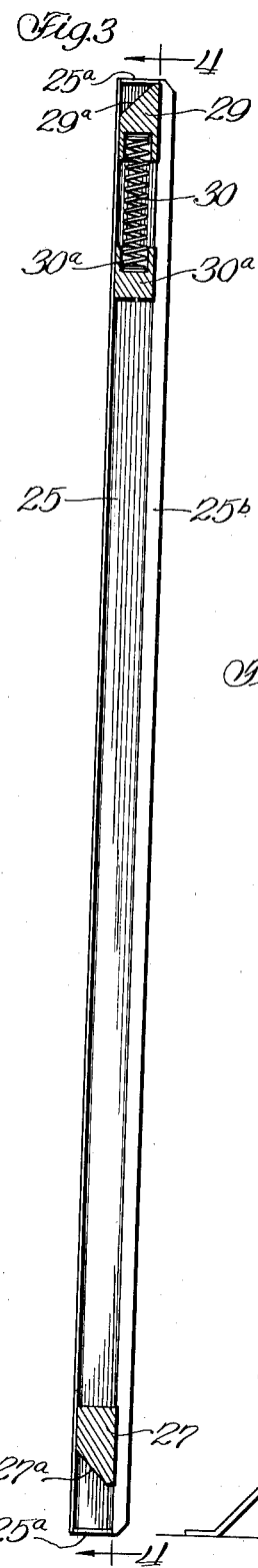
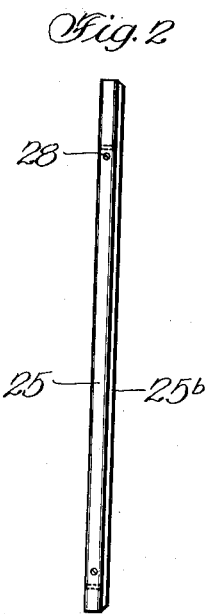
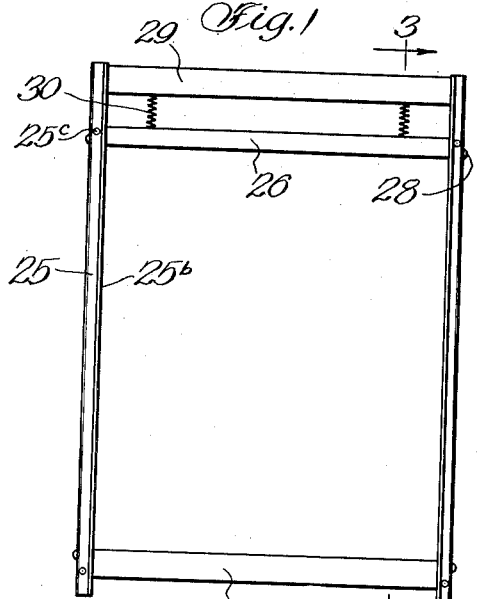
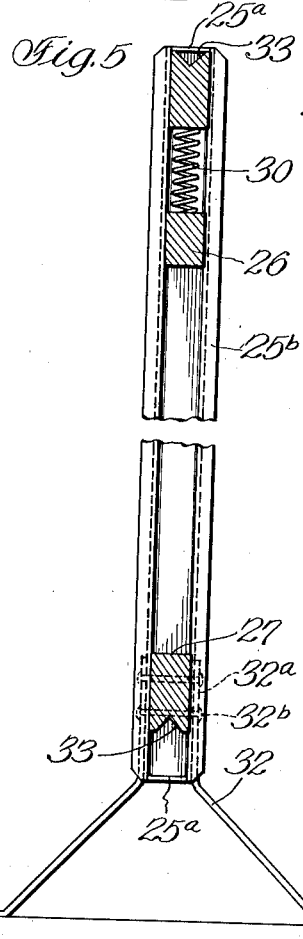
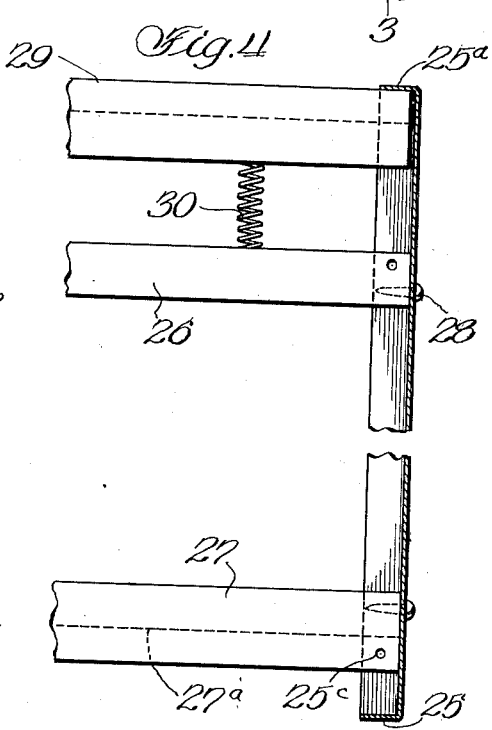
INVENTOR:-
Fred H. Loveless
BY Milo B. Stevens & Co.
ATTORNEYS.

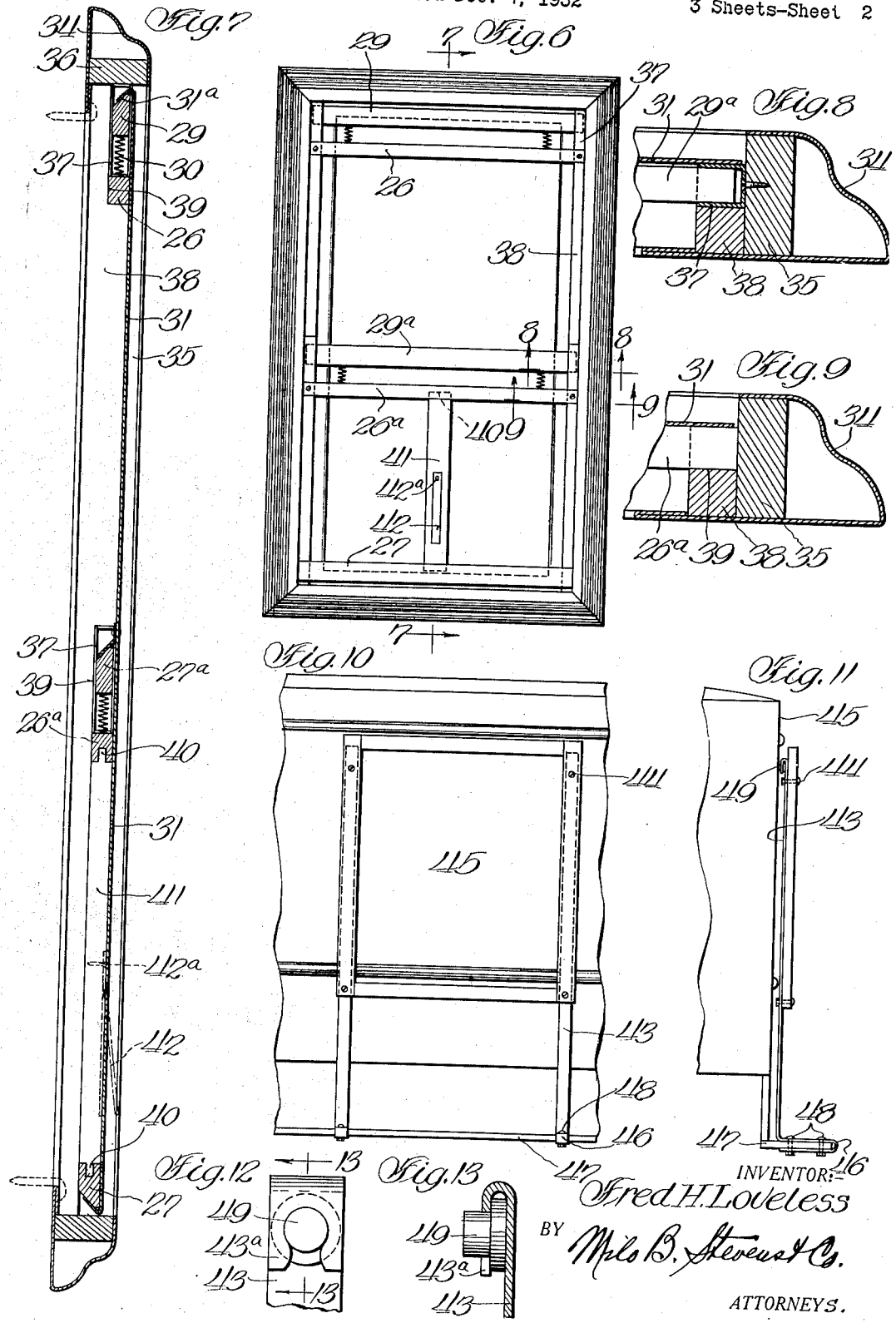

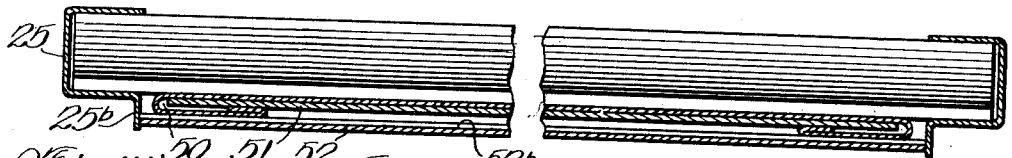
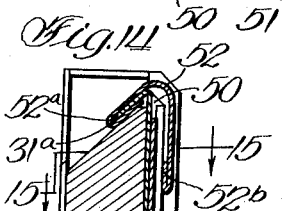
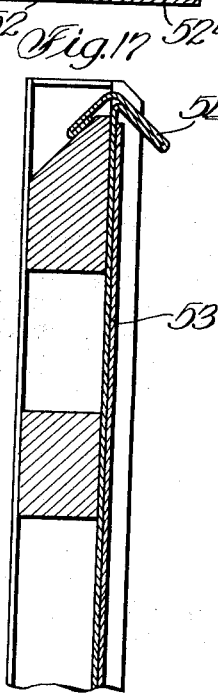
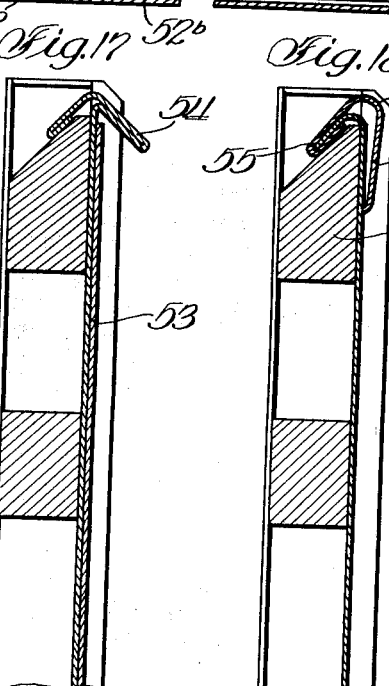
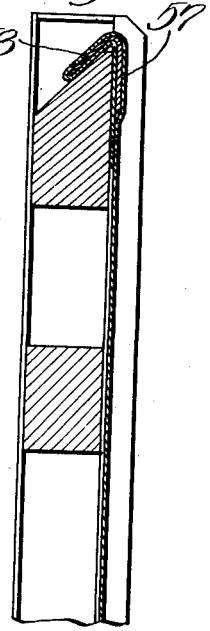
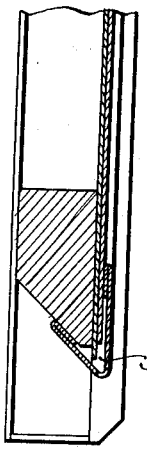
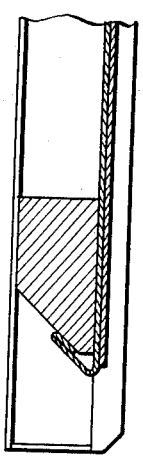
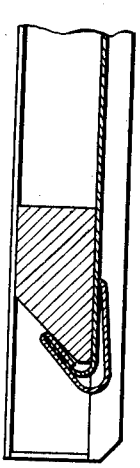
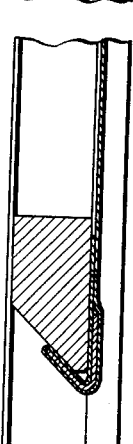
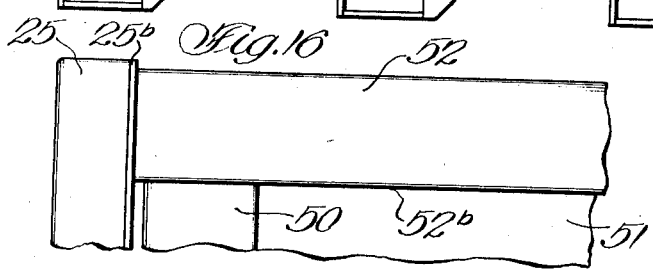

Patented Apr. 17, 1934

1,955,196

UNITED STATES PATENT OFFICE 1,955,196

SIGN

Fred H. Loveless, Chicago, Ill., assignor, by direct and mesne assignments, to Transit Advertising, Incorporated, Chicago, Ill., a corporation of Illinois Application December 7, 1932, Serial No. 646,044

8 Claims. (Cl. 40—156)

My invention relates to signs such as may be posted on vehicles, walls or stands, and my main object is to provide a sign which is easily changeable when new matter is desired to be displayed.

A further object of the invention is to embody a replaceable element in the novel sign to enable display matter to be changed by replacement and with facility.

A still further object of the invention is to provide a master frame for the novel sign to which the panel or front is applicable, such panel or front being removable for quick replacement by another bearing different display matter.

An additional object of the invention is to construct a novel sign with parts which are simple and rugged in construction and which may be produced and handled economically.

With the above objects in view, and any others which may suggest themselves from the specification and claims to follow, a better understanding of the invention may be had by reference to the accompanying drawings, in which—

Fig. 1 is an elevation of the frame employed in the novel sign;

Fig. 2 is an edge view of Fig. 1, taken from the left;

Fig. 3 is an enlarged section taken on the line 3—3 of Fig. 1;

Fig. 4 is a fragmental section taken on the line 4—4 of Fig. 3;

Fig. 5 is a vertical section of the frame as used in a stand;

Fig. 6 is an elevation of a modified frame, particularly suited for application to walls;

Fig. 7 is an enlarged section on the line 7—7 of Fig. 6;

Figs. 8 and 9 are detail sections on the lines 8—8 and 9—9 of Fig. 6;

Fig. 10 is an elevation showing an installation particularly suited for mounting at the side of a delivery car;

Fig. 11 is an edge view of the installation shown in Fig. 10;

Fig. 12 is an elevation of the detail shown in Fig. 11;

Fig. 13 is a section on the line 13—13 of Fig. 12;

Fig. 14 is a vertical section showing a modified frame;

Fig. 15 is a fragmental section on the line 15—15 of Fig. 14;

Fig. 16 is a top corner elevation of the frame shown in Fig. 14; and

Figs. 17, 18 and 19 are modifications of the frame for different types of signs.

Referring specifically to the drawings, 25 represents the side members of the sign frame which is typical of my invention. These members are of metallic channel construction with the hollows facing each other and have secured between them upper and lower wood rails 26 and 27, this being done by end screws 28. Some distance above the rail 26, I provide a rail 29 which is slidable in the side pieces 25 and is pressed upwardly by a set of vertical springs 30 whose ends are sunken in cavities 30a made in the facing edges of the rails 26 and 29. The side channels 25 are made with closure tabs 25a at the ends, the upper set of tabs forming limits for the upward movement of the rail 29.

The rails 27 and 29 are chamfered from the outer edge along their back sides, indicated at 27a and 29a. Thus, a sheet metal sign panel 31, which is illustrated in Fig. 7, may be applied frontally of the frame of Fig. 1 by making the panel with back-turned bends 31a at the top and bottom, such bends having the same angle as the chamfered portions 27a of the rail 27. The sign panel is applied by hooking it over the top rail 29 and then drawing down on the panel until it can hook or catch under the rail 27, as clearly shown in Fig. 7. Of course, the sign panel may have painted on it whatever display is desired; or, it may have a paper poster pasted upon it.

The front edges of the channels 25 are forwardly extended in the form of wings 25b, which act as shields to prevent rain from attacking the sign from the sides to loosen the paper sheet that may be pasted thereon. Also, the pieces 25 are bored through with holes 25c to enable screws or nails to fasten the frame to the side of a delivery car or the rails of a train platform, to be in readiness for the mounting of the sign panel. It will be seen that the latter may be quickly removed by pulling down, whereby to loosen it from the rail 27, and is quickly replaced with a new sign panel.

Fig. 5 shows the application of a novel sign to a stand where a sign is desired on each side. Thus, the frame receives at the bottom the legs 32 by having upper extensions 32a of the latter secured by bolts 32b to the front and rear of the channels 25. In this form, the rails 27 and 29 are made with V grooves 33 instead of the chamfers 27a and 29a, whereby to permit a sign panel to be hooked on each side.

Fig. 6 shows a more elaborate modification of the sign frame, this modification embodying a molding effect 34 of sheet metal construction. This construction is reinforced internally by side rails 35 and cross-rails 36, and is intended for application to walls and to be made in large sizes where desirable. It will be seen from Fig. 6 that the internal portion of the frame is similar to the original one, except that in the larger sizes it is advisable to have an intedmediate spring rail 29a functioning as the rail 29 in order to hold the medial portion of a large panel 31 from bulging out. The top and intermediate panel supports are preferably slidable in metallic end-guides 37, which are set in frame stiles 38, recessed at 39 to also receive the upper cross rail 26 and an intermediate one 26a. The latter and the bottom rail 27 are, in the case of large signs, fitted by mortising at 40 with a vertical spacer board 41, to the frontal side of which is secured at 42a a leaf spring 42. This spring has an outward tension, and when the sign panel is loosened from its bottom support, the spring 42 automatically acts to project the lower portion of the panel outwwardly, so that a hold may be taken on it to facilitate its removal from the other supports. It will be obvious from Fig. 7 that the sign panel is hooked on its top and intermediate supports first, and, as in the previous instance, finally sprung upon its bottom support 27.

While it has been indicated in connection with Fig. 1 that the basic frame of the novel sign is applicable by means of nails or screws to the side of a delivery car, at times it is objectionable to make holes in such side because of its highly finished surface which may be marred by making holes therein. To apply the frame to a car of this type, I employ the expedient of Figs. 10 to 13, mounting the frame on a pair of vertical strips 43 by means of bolts 44. These strips 43 are positioned close to the wall 45 of the car and extend downwardly to make outward and return bends 46 applicable upon the running board 47 of the vehicle and secured to such running board by bolts 48. The upper ends of the strips 43 are formed with forked return bends 43a which receive within them rubber buffers 49, these making contact with the surface of the car 45 by pressure through the formation of the strips 43 with a tensional factor operative in the direction of the car wall. Thus, the sign frame is supported firmly in front of the car wall and is ready to receive the interchangeable sign, as in the previous instance, without in any way marring the finish of the said wall.

Fig. 14 shows a panel having marginal side and bottom pockets 50 whereby an opening is left at the top for the sliding of a display card 51 into the said pockets. When this has been done, a top member 52 is applicable to make an upper pocket for the retention of the display card 51. The member 52 is made with an inclined slide-pocket 52a which is run onto the top bend 31a of the panel 31, the member serving by means of its frontal portion 52b to keep rain from running down on the display card. Also, the member 52 is of somewhat extra length, as shown in Figs. 15 and 16, to project somewhat beyond the ends of the display framing 50 and space the latter from the wings 25a of the main frame.

Fig. 17 shows a modification where the frontal panel receives a paper or cloth display mounting 53 by pasting or otherwise. In this respect, the panel is only changed at the top by the addition of a forwardly inclined doubled portion 54 acting as a visor to shed rain.

Fig. 18 shows another modification where the panel is of cloth or other limp material. In this case, the upper portion of the panel is bent back and clinched or fitted into a doubled portion 55 of a cross-member 56 similar to the member 52, a frontal portion 56a of this member also having a tension whereby to keep the panel to the top rail 29 of the frame.

Fig. 19 shows a still further modification wherein the panel is again of a linen materal but is made with top and bottom hems 57 in which are contained V-shaped cross-members 58 corresponding to the top and bottom portions of the metallic panel, such cross-members being concealed in this manner.

It will be seen that I have provided a sign which has a firm basic frame for the support of various styles in which the sign is desired. The frame is attachable to walls, vehicles and other objects, and has the novel spring means for exerting a firm hold upon the panel or other front which is mounted upon the frame, whereby to maintain the sign in steady and firm position against shocks or vibration. At the same time, it is apparent that the device is composed of few parts which are of a simple and rugged character and of a nature to be manufactured at low cost.

I claim:

1. A sign comprising a frame, a sign panel, rigid means for securing the panel at one end of the frame, yieldable means at the other end of the frame, and a terminal return portion of the panel for engaging said yieldable means, said rigid means comprising a chamfered cross-member carried by the frame, an inclined portion bent back from the end of the panel to hook upon the chamfered portion of the cross-member.

2. A sign comprising a frame, a sign panel, rigid means for securing the panel at one end of the frame, yieldable means at the other end of the frame and a terminal return portion of the panel for engaging said yieldable means, said yieldable means comprising a stationary rail secured to the frame, a floating rail spaced from the stationary rail, and spring means between the stationary and floating rails, the floating rail being engageable by the corresponding portion of the panel.

3. A sign comprising a frame, a sign panel, rigid means for securing the panel at one end of the frame, yieldable means at the other end of the frame, and a terminal return portion of the panel for engaging said yieldable means, said frame comprising laterally spaced channels with facing hollows, and cross rails fitted and secured in the end portions of the channels.

4. A sign comprising a frame, a sign panel, rigid means for securing the panel at one end of the frame, yieldable means at the other end of the frame, and a terminal return portion of the panel for engaging said yieldable means, said frame comprising laterally spaced channels with facing hollows, and cross rails fitted and secured in the end portions of the channels, the channels being perforated for the application of means to attach the frame to a support.

5. A sign comprising a frame, a sign panel, rigid means for securing the panel at one end of the frame, yieldable means at the other end of the frame, and a terminal return portion of the panel for engaging said yieldable means, said yieldable means comprising a stationary rail secured to the frame, a floating rail spaced from the stationary rail, and spring means between the stationary and floatings rails, the floating rail being engageable by the corresponding portion of the panel, said frame including laterally spaced channels with facing hollows and slidably disposing the end portions of the floating rail.

6. A sign comprising a frame, a sign panel, rigid means for securing the panel at one end of the frame, yieldable means at the other end of the frame, and a terminal return portion of the panel for engaging said yieldable means, said yieldable means comprising a stationary rail secured to the frame, a floating rail spaced from the stationary rail, and spring means between the stationary and floating rails, the floating rail being engageable by the corresponding portion of the panel, said frame including laterally spaced channels with facing hollows and slidably disposing the end portions of the floating rail, and end closures for the channels, one set of these serving as stops for the floating rail.

7. A sign comprising a frame having spaced side pieces connected at one end by a fixed cross member, a cross member at the other end and movable between said side pieces, spring means normally urging said movable cross member longitudinally outward of the frame, and a panel having hooked end terminals detachably engageable over said fixed and movable cross members.

8. A sign comprising in combination, a frame having spaced parallel side pieces, a fixed cross member rigidly connecting said side pieces adjacent each end of the frame, a panel, means on said panel for detachably engaging one of said fixed cross members, a movable cross member mounted for movement longitudinally of the side pieces, spring means normally urging said movable cross member longitudinally outwardly of the frame, and said panel having means for detachably engaging said movable cross member.

FRED H. LOVELESS.